(12) United States Patent
Wang et al.

(10) Patent No.: US 7,910,205 B2
(45) Date of Patent: Mar. 22, 2011

(54) RELEASE LAYER FOR IN-MOLD DECORATION

(75) Inventors: Fei Wang, Newark, CA (US); Scott C. J. Tseng, Fremont, CA (US); Xiaojia Wang, Fremont, CA (US); Kai-Chia Feng, San Mateo, CA (US); Haiyan Gu, Fremont, CA (US); HongMei Zang, Sunnyvale, CA (US); Rong-Chang Liang, Cupertino, CA (US)

(73) Assignee: SiPix Chemical Inc., Taoyuan County (TW)

( * ) Notice: Subject to any disclaimer, the term of this patent is extended or adjusted under 35 U.S.C. 154(b) by 470 days.

(21) Appl. No.: 12/039,554

(22) Filed: Feb. 28, 2008

(65) Prior Publication Data

US 2008/0152855 A1    Jun. 26, 2008

Related U.S. Application Data

(63) Continuation of application No. 11/104,790, filed on Apr. 12, 2005, now abandoned.

(60) Provisional application No. 60/564,018, filed on Apr. 20, 2004.

(51) Int. Cl.
*B32B 7/12* (2006.01)
*B32B 15/04* (2006.01)
(52) U.S. Cl. ......... 428/343; 428/345; 428/346; 428/354
(58) Field of Classification Search .................. 428/343, 428/345, 346, 354
See application file for complete search history.

(56) References Cited

U.S. PATENT DOCUMENTS

| | | | |
|---|---|---|---|
| 3,922,435 | A | 11/1975 | Asnes |
| 4,647,952 | A | 3/1987 | Pokora et al. |
| 5,212,044 | A | 5/1993 | Liang et al. |
| 5,248,742 | A | 9/1993 | McGarry et al. |
| 5,795,527 | A | 8/1998 | Nakamura et al. |
| 5,955,204 | A | 9/1999 | Yamamoto et al. |
| 5,993,588 | A | 11/1999 | Nakamura |
| 6,245,182 | B1 | 6/2001 | Nakamura |
| 6,245,183 | B1 | 6/2001 | Iorio et al. |
| 6,458,913 | B1 | 10/2002 | Honigfort et al. |
| 2005/0171292 | A1 | 8/2005 | Zang et al. |
| 2005/0181204 | A1 | 8/2005 | Wang et al. |
| 2005/0255314 | A1 | 11/2005 | Wang et al. |

OTHER PUBLICATIONS

Allen, K. (Oct. 2003). Electrophoretics Fulfilled. *Emerging Displays Review: Emerging Display Technologies, Monthly Report—Octomber 2003*, 9-14.

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.

Chen, S.M. (Jul. 2003) The Applications for the Revolutionary Electronic Paper Technology. *OPTO News & Letters*, 102, 37-41. (in Chinese, English abstract attached, full translation available upon request).

(Continued)

*Primary Examiner* — Victor S Chang
(74) *Attorney, Agent, or Firm* — Jianq Chyun IP Office

(57) ABSTRACT

This invention relates to a composition suitable for the formation of a release layer in an in-mold decoration or thermal transfer printing process. The invention also relates to a process for the formation of a release layer comprising dispersing or dissolving the release layer composition of the present invention in a solvent followed by curing said composition.

20 Claims, 1 Drawing Sheet

OTHER PUBLICATIONS

Chen, S.M. (May 2003) The New Applications and the Dynamics of Companies. *TRI*. 1-10. (In Chinese, English abstract attached, full translation availabe upon request).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Feely, et al. (Sep. 1986) The Role of the Latent Image in a New Dual Image, Aqueous Develpable, Thermally Stable Photoresist. *Polymer Engineering and Science*, vol. 26, No. 16, pp. 1101-1104.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted at USDC 4th Annual Flexible Display Conference 2005.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest*, 20.1.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) <<Format Flexible Microcup® Electronic Paper by Roll-to-Roll Manufacturing Process >>, Presentation conducted at the 14th FPD Manufacturing Technology Expo & Conference.

Macko & Ishida (2001) Structural Effects of Amines on the Photooxidative Degradation of Polybenzoxazines. *Polymer*, vol. 42, pp. 6371-6383.

Nikkei Microdevices. (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Wicks Jr. (1975) Blocked Isocyanates. *Progress in Organic Coatings*. vol. 3, pp. 73-99.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M. & Hou, Jack, (Feb. 2005) *Flexible Microcup® EPD by RTR Process*. Presentation conducted at 2nd Annual Paper-Like Displays Conference, Feb. 9-11, 2005, St. Pete Beach, Florida.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developms in Microcup® Flexible Displays*. Presentaiton conducted at the 6th Annual Flexible Display and Microelectronics Conference, Phoenix, AZ Feb. 6-8.

Zang, HM., (Sep. 2006) *Monochrome and Area Color Microcup® EPDs by Roll-to-Roll Manufacturing Process*. Presentation conducted at the Forth Organic Electronics Conference and Exhibition (OEC-06), Sep. 25-27, 2006, Frankfurt, Germany.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

US 7,910,205 B2

RELEASE LAYER FOR IN-MOLD DECORATION

This application is a continuation application of U.S. application Ser. No. 11/104,790, filed Apr. 12, 2005, now abandoned; which claims the priority under 35 USC 119(e) of U.S. Provisional Application No. 60/564,018 filed on Apr. 20, 2004. The contents of both applications are incorporated herein by reference in their entirety.

FIELD OF THE INVENTION

This invention relates to a composition suitable for the formation of a release layer in an in-mold decoration or thermal transfer printing process.

BACKGROUND OF THE INVENTION

In-mold decoration processes involve decorating articles as they are formed, in mold, of a heated plastic material being injected into a mold cavity. Usually a tape or strip of a decorating or protective material is automatically or manually advanced, pre-fed and positioned in the mold cavity at each molding cycle, interfacing therein with the plastic material as it is filled into the mold cavity, under heat and pressure. As the article is formed, the decorating material forms on the surface of the article and becomes an integral and permanent part of the article, through thermal transfer in the in-mold decoration process. Other molding processes such as thermal forming, blow molding and compression molding or stamping may also be used for the transfer of a decorating or protective material. Sometimes the process may also be called in-mold labeling or in-mold coating, and the transferable protective material may be called a thermal transfer overcoat or durable coat layer.

The decoration tape or strip usually comprises a carrier layer, a release layer, a durable layer, an adhesive or tie-coat layer and also a layer of decorative designs (metal or ink). After the injection molding transfer, the carrier layer and the release layer are removed, leaving the durable layer as the outmost layer. The release layer allows the release of the carrier layer in a manner that minimizes damage to the display panel and enables a fully automated roll transfer process during molding. The durable layer serves as a layer to protect the decorative designs and also the molded article. To improve the conformation properties of the durable layer during injection molding of complicated three-dimensional parts, a UV curable durable layer is typically used.

U.S. Pat. No. 5,993,588 discloses a protecting layer (i.e., the durable layer) formed from a heat and radiation curable resin composition which comprises a polyfunctional isocyanate and a polymer having a (meth)acryl equivalent weight from 100 to 300 g/eq., a hydroxyl value from 20 to 500 and a weight average molecular weight from 5,000 to 50,000. The document also discloses that the durable layer may contain a UV absorber to impart weather resistance to the protecting layer on the molded article. The UV absorber also reduces the photosensitivity of the durable layer and, to some degree, improves the room light handleability of the decoration film during or before injection molding. Premature crosslinking of the durable layer in room light may occur during coating, printing, metal deposition, storage or handling of the tape or strip. Suitable UV absorbers mentioned include salicylic acid-based, benzophenone-based, diphenyl acrylate-based, benzotriazole-based, triazine-based and amine-based UV absorbers.

However, incorporating a UV absorber into a durable layer (i.e., protecting layer) formulation brings many tradeoffs. For example, it decreases the efficiency of the photoinitiator in the composition due to competitive light absorption of the UV absorber. More photoinitiators may be needed to compensate the loss of photosensitivity of the post-molding UV curing step. Sometimes, the UV absorber may also cause a yellow or fluorescence tint of the protecting layer.

SUMMARY OF THE INVENTION

The first aspect of the invention is directed to a composition of a release layer which comprises a copolymer or interpenetration network (IPN) formed from a composition comprising an amine-aldehyde condensate and a monomer or polymer comprising a moiety that is capable of retarding, inhibiting or quenching radical polymerization or crosslinking reaction.

The second aspect of the invention is directed to a composition of the first aspect of the invention which further comprises a UV absorbing moiety.

The third aspect of the invention is directed to a composition of the first aspect of the invention which further comprises a silicone resin.

The fourth aspect of the invention is directed to a process for the formation of a release layer which process comprises dispersing or dissolving the release layer composition of the present invention in a solvent followed by curing said composition.

The release layer of the present invention has improved release characteristics, adhesion properties, room-light handleability and shelf-life stability, without the tradeoff in photosensitivity in the post-molding UV curing step.

The content of each document referred to in this application is incorporated by reference into this application in its entirety.

DETAILED DESCRIPTION OF THE INVENTION

Figure 1:
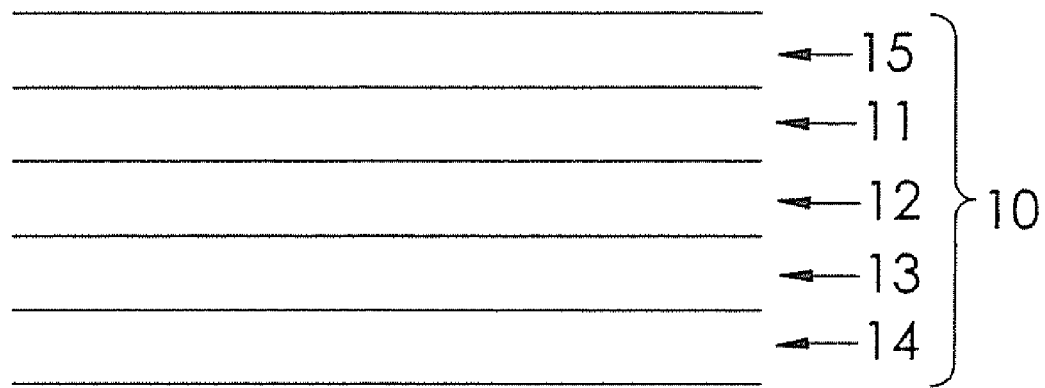
FIG. 1 is a cross section view of an in-mold decoration tape or strip.

FIG. 1 is a cross-section view of an in-mold decoration tape or strip (10) which comprises a carrier layer (15), a release layer (11), a durable layer (12), a decorative design layer (13), and an adhesive layer (14).

Figure 2:
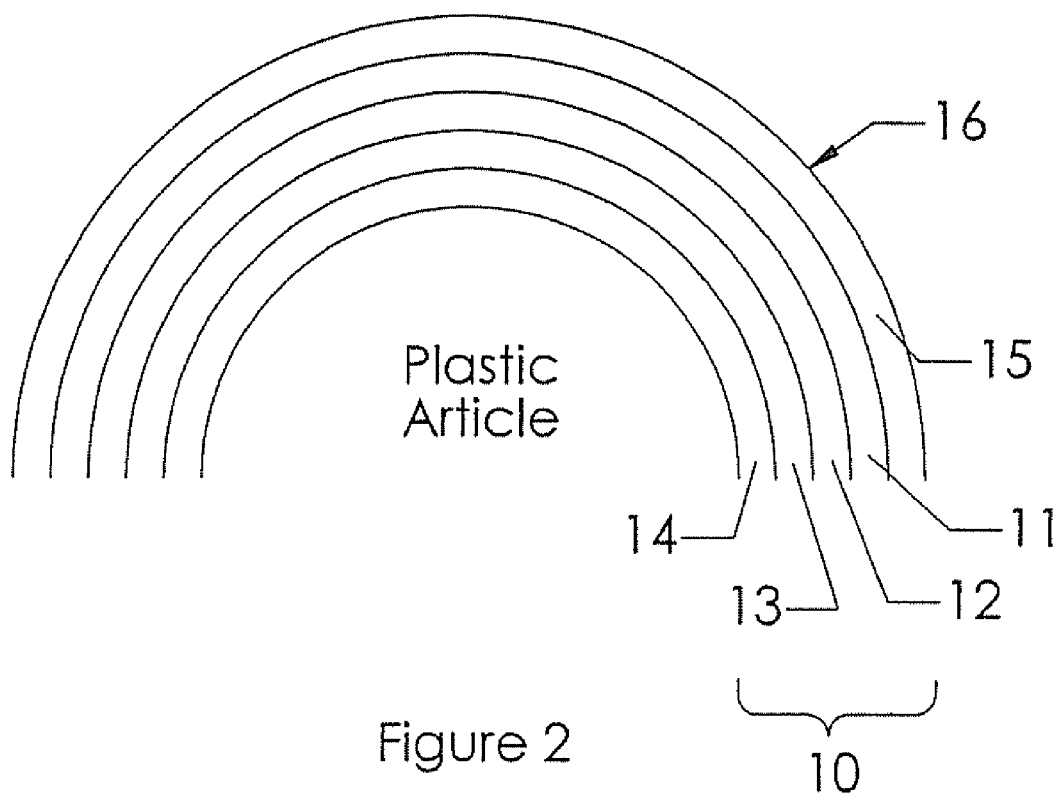
FIG. 2 shows how the in-mold decoration tape or strip is fed into a mold cavity.

In an in-mold decoration process, the tape or strip (10) is fed into a mold cavity (16) automatically or manually with the carrier layer (15) in contact with the mold surface as shown in FIG. 2. The tape or strip may be thermally formed to a desirable shape before the feeding step.

The carrier (15) and adhesive (14) layers may be formed by methods known in the art and all of the previously known carrier and adhesive layers may be incorporated into the present invention.

For example, the carrier layer (15) usually is a thin plastic film with a thickness of from about 3.5 to about 100 microns, preferably about 10 to about 50 microns. Polyethylene terephthalate (PET), polyethylene naphthate (PEN) or polycarbonate (PC) film is particularly preferred because of their ready availability and thermomechanical stability.

The adhesive layer (14) is incorporated into the in-mold decoration tape or strip to provide optimum adhesion of the decorative layer to the top surface of the molded article. The adhesive layer may be formed from a material such as polyacrylate, polymethacrylate, polystyrene, polycarbonate, polyurethane, polyester, polyamide, epoxy resin, ethylene vinylacetate copolymers (EVA), butadiene rubber, thermoplastic elastomer or the like, or a copolymer, blend or composite thereof. Hot melt or heat activated adhesives such as polyacrylate, polyurethane or polyamide are preferred. Water based latexes such as polyurethane, acrylic and vinyl acrylic latexes or hybrid latexes thereof are also preferred. The thickness of the adhesive layer may be in the range of about 1 to about 20 microns, preferably in the range of about 2 to about 6 microns.

The decorative layer (13) may comprise an ink pattern and/or a metallic layer formed from a method such as vapor deposition or sputtering, optionally followed by a patterning process. The ink pattern may be formed by a printing process such as gravure, flexo, screen, thermal transfer or the like. Optionally, a tie layer may be used to enhance the adhesion between the durable layer and the decoration layer.

The durable layer (12) may be formed from any of the compositions known in the art. For example, suitable materials for the durable layer may include, but are not limited to, radiation curable multifunctional acrylates (such as epoxy acrylates, polyurethane acrylates, polyester acrylates, silicone acrylates, glycidyl acrylates), multifunctional epoxides, multifunctional vinyl esters or ethers, diallyl phthalate and blends thereof.

Other suitable durable layer compositions are disclosed in U.S. Provisional Application No. 60/532,003, filed on Dec. 22, 2003; and U.S. Provisional Application No. 60/541,797, filed on Feb. 3, 2004; the contents of both are incorporated herein by reference in their entirety.

The durable layer composition particularly suitable for the present invention may comprise a binder and a photopolymerizable material such as a multifunctional acrylate, a multifunctional epoxide, a multifunctional vinyl such as multifunctional vinyl ether. The durable layer may comprise a crosslinked network formed from the binder and a crosslinker such as a multifunctional isocyanate, multifunctional thioisocyanate or multifunctional epoxide.

The durable layer of the decoration tape or strip may be partially or fully cured. If partially cured, a post curing step will be employed after the molding and/or transferring step to enhance the durability, particularly hardness, chemical resistance and scratch resistance.

The durable layer may also comprise an additive such as thickener, surfactant, dispersant, UV stabilizer or antioxidant to control the rheology, wettability, coating properties, weatherability and aging properties. Fillers such as silica, $Al_2O_3$, $TiO_2$, $CaCO_3$, microcrystalline wax or polyethylene, Teflon or other lubricating particles may also be added to improve, for example, scratch resistance and hardness of the durable layer. The durable layer is usually about 2 to about 20 microns, preferably about 3 to about 8 microns in thickness.

The first aspect of the invention is directed to a composition for a release layer which comprises a copolymer or interpenetration network (IPN) formed from a composition comprising (i) an amine-aldehyde condensate and (ii) a monomer or polymer comprising a moiety that is capable of retarding, inhibiting or quenching radical polymerization or crosslinking reaction. The component (ii), a monomer or polymer comprising a moiety that is capable of retarding, inhibiting or quenching radical polymerization or crosslinking reaction, is hereinafter referred to as a radical inhibitor or quencher for brevity.

Useful examples of the amine-aldehyde condensates may include, but are not limited to, the formaldehyde condensates of a multifunctional amine such as melamine or urea.

The concentration of the amine-formaldehyde condensate in the dried release layer ranges from about 40% to about 95%, preferably from about 50% to about 90% and more preferably about 60% to about 85%, by weight.

Examples of commercially available amine-aldehyde condensate may include products by Cytec, such as Cymel® (melamine formaldyhyde), Melurac® (melamine urea formaldehyde) or Urac® (urea formaldehyde) and products from Surface Specialty UCB, such as Resimene® (melamine-formaldehyde, HM or BM series or urea-formaldehyde, U series), Maprenal® (melamine-formaldehyde or benzoguanamine-formaldehyde), Viamin® (highly reactive urea-formaldehyde with alkyl or nitrocellulose resin) or Modacure® (highly reactive methylated melamine-formaldehyde modified styrene allyl alcohol resin).

Useful radical inhibitors or quenchers may include, but are not limited to, phenols, phenolic resins or precondensates thereof, oximes, hindered amine oxides, nitrosobenzenes and oxidized derivatives or metal complexes thereof.

Suitable phenols and phenolic resins or precondensates thereof may include, but are not limited to phenol, methoxyphenol, cresol, phenol formaldehyde resins, novolacs, resoles, resorcinol, salicylates, hydroxyl salicylates, trihydroxybenzene and analogs, derivatives or oxidized products thereof.

The phenolic resin or a precondensate thereof is usually heat treated or oxidized before, during or after the composition is coated onto the carrier layer. The oxidized phenolic resin has a high extinction coefficient and can provide strong UV light absorbance even in a thin film of below or about 1 um.

Oxidation of the phenolic resin can be achieved thermally and/or photochemically either in solution or in the form of dried coating. A sensitizer (such as isopropylthioxanthone or ITX) or catalyst (such as benzoyl peroxide) may be used to improve the efficiency of photo or thermal oxidation in which the phenolic group is believed to be oxidized to form a quinone derivative, which exhibits strong UV absorbance in the range of 300-500 nm.

Examples of commercially available phenol and phenolic resin include hydroquinone, methyl hydroquinone, alkylated phenols, Rutaphen® series of phenolic resins from Bakelite AG; GPRI®, BKS® and Arylzene® series of phenolic resins from Georgia-Pacific Resins, Inc.; Resicure®, HRJ® and SP® series of phenolic resins from Schenectady International Inc., Arofene® (from Ashland), Phenodur® (resole type of phenolic resins) and Santolink® (such as EP 560, a solution of a butyl etherified phenol formaldehyde crosslinker resin).

Polyphenols prepared by enzymatic coupling as disclosed in, for example, U.S. Pat. No. 4,647,952 and U.S. Pat. No. 5,212,044, may also be suitable as the radical inhibitor or quencher in the composition.

Suitable hindered amine oxides may include, but are not limited to, TEMPO (2,2,6,6-tetramethyl-1-piperidinyloxy), 4-hydroxy TEMPO and 4-oxo-TEMPO.

The radical inhibitor or quencher may take up about 1% to about 60%, preferably about 5% to about 50%, by weight of the dried release layer.

The presence of the radical inhibitor or quencher inhibits or quenches the undesirable radical reaction at the interface between the release and a radically curable durable layer before the release layer is peeled-off during or after injection molding. The presence of a covalent bonded radical inhibitor or quencher in the release layer improves the product reliability, shelf-life and handle-ability of the resulting in-mold decoration film. When a phenolic inhibitor or quencher is used, the oxidation product of the phenolic compound may serve as an effective UV screening agent and further improves the storage stability and room light handleability of the durable layer coated thereon.

The release layer composition may further comprise a catalyst or a crosslinking agent for the condensation reaction.

Useful catalysts may include, but are not limited to, sulfuric acid, toluene sulfonic acid, dodecylsulfonic acid, dodecylbenzenesulfonic acid, hydrochloric acid, phosphoric acid, $HBF_4$, $HPF_6$, $HSbF_6$, $HAsF_6$ and the salts thereof with a fugitive base such as ammonia or triethylamine. Preferred catalysts are toluenesulfonic acid or dedecylbenzenesulfonic acid. The concentration of the catalyst may range from about 0.1% to about 5% and preferably about 1% to about 4%, by weight of the dried release layer.

Useful crosslinking agents may include, but are not limited to, formaldehyde, glyoxal, succinaldehyde, hexamethylene tetramine, phenolics, malonate blocked isocyanates, polyols, carbamate functionalized polymers, amine functionalized polymers and amide functionalized polymers. The concentration of the crosslinking agent, if present, may range from about 0.1 to about 10% by weight and preferably about 1 to about 5%, by weight of the dried release layer.

The composition may further comprise a UV absorbing moiety. Useful UV absorbing moieties may include, but are not limited to, o-hydroxybenzophenone, 2,2'-dihydroxy-4-methoxybenzophenone, o-hydroxyphenyl-triazine, salicylates, α-cyano-β-phenyl-cinnamates, hydroxyphenyl benzotriazole and benzoxazinone. The UV absorbing moiety may be formed in-situ by oxidation thermally and/or photochemically of the radical inhibitor or quencher in the release layer composition.

Preferably the UV absorbing moiety does not absorb light at wavelengths above about 420 nm. The UV absorbing moiety may be self-crosslinking or reactive to other crosslinkable matrix to construct an interpenetration network (IPN) or a fully-crosslinked network. The concentration of the UV absorbing moiety, if present, may range from about 0.1 to about 20%, and preferably about 2 to about 10%, by weight of the dried release layer.

When the durable layer (12) composition comprises a multifunctional acrylate and a multifunctional isocyanate or thioisocyanate, the phenolic moiety in the radical inhibitor or quencher in the release layer composition may react with the isocyanate or thioisocyanate in the durable layer and such a reaction may introduce a certain amount of adhesion between the durable layer and the release layer to avoid delamination during handling and storage of the decoration tape or strip. The linkage, urethane or thiourethane, formed between the isocyanate or thioisocyanate group from the durable layer and the phenolic moiety from the release layer, decomposes at a temperature lower than 180° C., preferably lower than 150° C. and more preferably lower than 120° C. The thermal dissociation of the urethane or thiourethane linkage allows heat sensitive release property of the release layer and reasonably good edge sharpness of the molded article.

The release layer composition of the present invention may further comprise a silicone resin. Suitable silicone resins may include, but are not limited to, silicone block or graft copolymers or silicone polymers having at least one reactive functional group. Examples of silicone block or graft copolymers include siloxane-poly(ethylene glycol)-poly(propylene glycol) block copolymers or graft copolymers such as Silwet silicones from OSi. Examples of silicone polymers having at least one reactive functional group include those having at least one reactive functional group such as epoxy, isocyanate, hydroxyl, amide or the like, in the main chain or side chains. Suitable main chains of the silicone polymers may include polydialkylsiloxane and the like.

Silicone resins with reactive functional group can be reacted onto the release layer before, during or after coating. Chemical bondings may include, but are not limited to, urethane linkage which can be used to link polydimethylsiloxane having hydroxyl functional groups with the phenolic resin in the release layer composition. The silicone resin having hydroxyl functional groups may also react with the melamine-formaldehyde condensate in the release layer composition to be crosslinked. The concentration of the silicone resin may range from about 0.1% to about 10% and preferably from about 1% to about 6%, by weight of the dried release layer.

The presence of a surface active silicone resin such as a Silwet silicone surfactant also allows improvement of the coating quality and release/transfer properties of the decoration foil during injection molding, particularly in maintaining long term shelf life of release properties after aging under high humidity and/or high temperature conditions.

The release layer composition of the present invention may further comprise one or more of the following additives such as filler, surfactant, antifoamer or defoamer, thickener, binder or rheology modifier.

Suitable fillers may include, but are not limited to, silica, $CaCO_3$, microgel particles, organic particles and mica. Its concentration, if present, may range from about 0.5 to about 20% and preferably about 1 to about 10%, by weight of the dried release layer.

Suitable surfactants may include, but are not limited to, Silwet surfactants, poly(ethylene oxide-b-propylene oxide) such as Pluronic surfactants from BASF and condensates of phenol and ethyleneoxide such as Triton surfactants from Rohm & Haas. Its concentration, if present, may range from about 0.05 to about 5% and preferably about 0.1 to about 3%, by weight of the dried release layer.

Suitable thickeners, binders or rheology modifiers may include, but are not limited to, acrylic or methacrylic copolymers, acrylamide copolymers, cellulose derivatives such as cellulose acetate butyrate or cellulose acetate propionate, poly(styrene-co-allyl alcohol), vinylpyrrolidone copolymers and the like. The thickners, binders or rheology modifiers may be either non-reactive or reactive to the release layer matrix. If present, the concentration of the thickner, binder or rheology modifier may take up about 1% to about 40% and preferably about 5% to about 15%, by weight of the dried release layer.

The components of the release layer composition of the present invention may be dispersed or dissolved in a suitable solvent, such as ketones, esters, ethers, glycol ethers, glycolether esters, pyrrolidones, with ketones and esters such as methyl ethyl ketone, (MEK), methyl propyl ketone (MPK), cyclohexanone, ethyl acetate, propyl acetate or butyl acetate as the preferred. The release layer composition is coated, dried and cured on a carrier web substrate (such as PET).

In the formation of the in-mold decorative tape or strip (10), the release layer (11), the durable layer (12), the decorative design layer (13) and the adhesive layer (14) are sequentially coated or laminated onto the carrier layer (15). The coating may be accomplished by methods such as wire wound bar coating, slot coating, doctor blade coating, gravure coating, roll coating, comma coating, lip coating or the like or printing methods such as gravure printing, screen printing or the like.

The release layer of the present invention may be thermally or photochemically cured during or after the drying of the coating step. The thermal cure can be carried out at about 50° C. to about 120° C. for various lengths of time, for example, several minutes to hours, depending on the curing conditions and the composition. The durable, decoration and adhesive layers are then coated onto the release layer and they are transferred to the surface of the molded article by peeling off the release layer and the carrier substrate during or after injection molding. The durable layer is now on the top of the molded article and may be UV post cured using an UV conveyor at a speed of, for example, 0.6 ft/min to 10 ft/min. The UV curing energy needed is usually in the range of from about 0.1 to about 5 J/cm$^2$, preferably about 0.3 to about 1.2 J/cm$^2$.

The release layer of the present invention is suitable for all in-mold decoration processes for the manufacture of a plastic article. Suitable molding processes for transferring of the decoration layer on the release layer of the present invention may include, but are not limited to, injection molding, compression molding, thermal forming, vacuum forming, blow molding or a combination of any two or more identified.

Examples of the material suitable for forming the molded article may include, but are not limited to, thermoplastic materials such as polystyrene, polyvinyl chloride, acrylics, polysulfone, polyarylester, polypropylene oxide, polyolefins, acrylonitrile-butadiene-styrene copolymers (ABS), methacrylate-acrylonitrile-butadiene-styrene copolymers (MABS), polycarbonate, polybutylene terephthalate (PBT), polyethylene terephthalate (PET), polyurethanes and other thermoplastic elastomers or blends thereof, and thermoset materials such as compression molding or reaction injection molding grade polyurethanes, epoxy resin, unsaturated polyesters, vinylesters or composites, prepregs and blends thereof.

The article may be a plastic cover of a cell phone or pager. In fact, the release layer is useful for any plastic articles manufactured from an in-mold decoration process, such as personal accessories, toys or educational devices, plastic cover of a personal digital assistant or e-book, credit or smart cards, identification or business cards, face of an album, watch, clock, radio or camera, dashboard in an automobile, household items, laptop computer housings and carrying cases or front control panels of any consumer electronic equipments. This is clearly not exhaustive. Other suitable plastic articles would be clear to a person skilled in the art and therefore they are all encompassed within the scope of the present invention. The release layer of the present invention is also useful in applications such as the thermal transfer protective coating for thermal printing, inkjet printing and passport and other identification applications.

EXAMPLES

The following examples are given to enable those skilled in the art to more clearly understand, and to practice, the present invention. They should not be considered as limiting the scope of the invention, but merely as being illustrative and representative thereof.

Example 1

UV Screening Efficiency

A. Formation of Film Comprising a Release Layer of the Present Invention 1.53 Grams of Durite SD-1708 (phenolic resin, Bordon Chemical, Inc.) was dissolved in 7.2 gm of MEK. 1.3 Grams of CYMEL 303ULF (methylated melamine resin, Cytec Industries Inc), 0.03 gm of CYCAT 600 (DDBSA, dodecylbenzene sulfonic acid, a crosslinking catalyst, Cytec Industries Inc.), 0.07 gm of DMS S12 (silanol terminated polydimethylsiloxane, Gelest Inc.) and 1.4 gm of CAB 553-04 (10% in MEK) (cellulose acetate butyrate, Eastman Chemical Co.) were then added and mixed with a Vortexer. The release layer composition formed was coated on a PET film (1.42 mil, PT1 from Mitsubishi, Interfilm Holding, Inc., Easley S.C.) with a #6.5 Meyer bar with a target thickness of about 2 um. The coated film was dried at 70° C. for 5 minutes and cured at 120° C. for 10 minutes.

The resultant film was then exposed to UV (Fusion UV, H lamp at dosage of 4.2 J/cm$^2$) using a conveyor curing system.

A durable layer composition consisting of 7.67 gm (15% in MEK) CAB-553-0.4 (cellulose acetate butyrate, from Eastman Chemical Co.), 2.94 gm (50% in MEK) of Ebecryl 1290 (aliphatic polyurethane acrylate, UCB Chemicals), 1.2 gm (30% in MEK) of MEK-ST (a silica dispersion from Nissan Chemicals), 0.40 gm of (25% in MEK) 1:1 w % ratio of triethanolamine and poly-Q (aminated tetrol from Arch Chemicals, Norwalk, Conn.) and 0.43 gm of a photoinitiator (PI) solution containing 1.5% of BMS (4-(p-tolylthio)benzophenone, Aldrich, Milwaukee, Wis.), 0.8% of Irgacure 651 (2,2-dimethoxy-1,2-diphenylethane, Ciba Speciality Chemicals, Tarrytown, N.Y.), 0.15% of ITX (isopropyl thioxanthone, Aldrich, Milwaukee, Wis.), 0.2% of DBTDL (dibutyltin dilaurate, Aldrich, Milwaukee, Wis.), 0.1% of Irganox 1035 (thiodiethylene bis[3-(3,5-di-tert-butyl-4-hydroxyphenyl)propionate], Ciba Speciality Chemicals, Tarrytown, N.Y.) and 0.2% of Tinuvin 123 [decanedioic acid, bis(2,2,6,6-tetramethyl-1-(octyloxy)-4-piperidinyl)ester, reaction products with 1,1-dimethylethylhydroperoxide and octane from Ciba Speciality Chemicals, Tarrytown, N.Y.] in MEK was then overcoated onto the cured release layer using a #28 Meyer bar with a target thickness of about 7 um and dried at 70° C. for 20 minutes.

The resultant film was then cured by UV exposure (Fusion D bulb, 0.8 J/cm$^2$) using a conveyor curing system from PET side with a step wedge. The photosensitivity reading on a 0.15 OD step wedge was 11.

B. Comparative Sample

The durable layer formed from the composition of Part B above was coated on a PET film (1.5 mil) using a #28 Meyer bar with a target thickness of about 7 um and dried at 70° C. for 5 min. The resultant film was cured by UV exposure (Fusion D bulb, 0.8 J/cm$^2$) using a Fusion conveyor curing system from PET side with a step wedge. The photosensitivity reading on a 0.15 OD step wedge was 13.

The UV photosensitivity of the durable layer was effectively retarded to be half, based on the step wedge reading, due to the UV screening from phenolic resin-modified release layer. In other words, UV protection of the durable layer was effectively increased 100% due to the presence of the release layer of the present invention.

Example 2

Thermal Sensitive Release & Edge Sharpness Improvement

The composition of the release layer of Example 1A was used in this example. A durable layer was prepared by pre-reaction of 6.84 gm (15% in MEK) of CAP-504-0.2 (cellulose acetate propionate, from Eastman Chemical Co.) and 1.89 gm CaCO$_3$ (27.5% in MEK, containing 6.27% CAP-504-0.2) with 2.53 gm (15% in MEK) of Desmodur N3300A (polyisocyanate, Bayer Polymers) and 0.1% DBTDL at 50° C. for 18 minutes. After pre-reaction, the following ingredients were then added into the pre-reacted CAP solution: 2.94 gm (50% in MEK) of Ebecryl 1290 (aliphatic polyurethane acrylate, UCB Chemicals), 0.1 gm of MEK-ST (30% in MEK, a silica dispersion from Nissan Chemicals), 0.40 gm of (25% in MEK) 1:1 w % ratio of triethanolamine and poly-Q (aminated tetrol from Arch Chemicals, Norwalk, Conn.) and 0.43 gm of a photoinitiator (PI) solution containing 1.5% of BMS (4-(p-tolylthio)benzophenone, Aldrich, Milwaukee, Wis.), 0.8% of Irgacure 651 (2,2-dimethoxy-1,2-diphenylethane), 0.15% of ITX, 0.2% of DBTDL, 0.1% of Irganox 1035 (thiodiethylene bis[3-(3,5-di-tert-butyl-4-hydroxyphenyl)propionate]) and 0.2% of Tinuvin 123 [decanedioic acid, bis(2,2,6,6-tetramethyl-1-(octyloxy)-4-piperidinyl)ester, reaction products with 1,1-dimethylethylhydroperoxide and octane from Ciba Specialty Chemicals] in MEK. The resultant durable solution was then overcoated onto the cured release layer using a #28 Meyer bar with a target thickness of about 7 um and thermal cured at 70° C. for 20 minutes.

An adhesive solution consisting of 46.24 gm of Sancure 2710 (aliphatic polyurethane from Noveon Inc., Cleveland, Ohio), 2.01 gm of Bostex 361 [butylated hydroxytoluene (BHT), Akron Dispersions, Akron, Ohio], 1.26 gm of SOCAL 31 (precipitated calcium carbonate, Solvay Chemicals, Houston Tex.), 1.91 gm of EPOSTAR M30 (Benzoguanamine-formaldehyde microparticle, Nippon Shokubai, Chiyoda-ku, Japan) and 48.58 gm of de-ionized water was then overcoated onto the cured durable layer using a #16 Meyer bar with a target thickness of about 3 um. The resultant film was inserted into an injection mold. A PMMA (polymethylmethacrylate) was injected into the mold cavity at 490° F. with the adhesive layer facing the plastic mixture. The durable layer and the adhesive layer were completely transferred to the molded plastic article after the release film was peeled off. The edge sharpness was excellent.

Example 3

Less Yellowness

The same compositions of Example 1A were used except that, in the release layer, 1.53 gm of Resicure 5200 (meta-Novolac resin, Shenectady International Inc.) was used to replace Durite SD-1708, 0.12 gm of CYCAT600 was used to replace 0.03 gm of CYCAT and 3.06 gm of CAB 553-04 (10% in MEK) was used to replace 1.4 gm of CAB 553-04. The same degree of UV screening was observed with little yellowing in the visible region.

Example 4

Less Yellowness

The release layer composition of Example 3 was used except that, in the release layer, 1.53 gm of SP12 (resoles resin, Shenectady International Inc.) was used to replace Resicure 5200. Very little yellowing was observed with almost the same degree of UV absorption at wavelength of 350 nm. The hydroxyl groups on the resoles resin were crosslinked with the melamine/formaldehyde matrix.

Examples 5-7

Use of Silicone-Alkyloxide Copolymers

The release layer composition of Example 3 was used except that 0.07 gm of Silwet 7280 (Example 5) or Silwet 7210 (Example 6) or Silwet 7657 (Example 7) (Silwet is the trade name for polyethylene oxide-polypropylene oxide-dimethylsiloxane copolymer, OSI) was used to replace DMS-S12. The hydroxyl groups on the Silwet silicone resin were crosslinked with the melamine/formaldehyde matrix.

Examples 8-10

Use of Combination of Silicone-Alkyloxide Copolymers

The release layer composition of Example 3 was used except that different combinations of alkyloxide-siloxane copolymers were used to replace DMS-S12. In Example 8, a 4:1 ratio of Silwet L7657 and L7210 was used. In Example 9, a 7:3 ratio of Silwet L7657 and L7210 was used. In Example 10, a 1:1 ratio of Silwet L7657 and L7210 was used. The examples resulted release layers of different critical surface tensions and different release forces between the release and durable layers.

Example 11

Use of 2,6-Bis(hydroxymethyl)-p-Cresol

The compositions in Example 1A were used except that, in the release layer, 4.6 gm of 2,6-bis(hydroxymethyl)-p-cresol (10% in ethylene glycol dimethyl ether) (Aldrich) was used to replace Durite SD-1708, 0.08 gm of CYCAT600 was used to replace 0.03 gm of CYCAT 600 and 1.6 gm of CAB 553-04 (10% in MEK) was used to replace 1.4 gm of CAB 553-04. 0.1 Gram of Silwet L7230 was used to replace 0.07 gm of DMS S12. The same degree of UV screening was observed with little yellowing in the visible region.

Example 12

Reactive UV Absorber
2,2'-Dihydroxy-4-Methoxybenzophenone

The compositions of Example 1A were used except that, in the release layer, 0.6 gm of UVA 2,2'-dihydroxy-4-methoxybenzophenone (10% MEK) (from Aldrich) was used. 2.0 Grams of 2,6-bis(hydroxymethyl)-p-cresol (10% in ethylene glycol dimethyl ether) (Aldrich) was used to replace Durite SD-1708, 0.08 gm of p-toluenesofonic acid (from Aldrich) was used to replace 0.03 gm of CYCAT 600 and 1.6 gm of CAB 553-0.4 (10% in MEK) was used to replace 1.4 gm of CAB 553-04. 0.1 Gram of Silwet L7230 was used to replace 0.07 gm of DMS S12. Much higher degree of UV screening (2 times UV screen of the release layer with only SP-12) was observed with almost no observable yellowness in the visible region.

Example 13

Reactive UV Absorber
2-Hydroxy-1-Naphthaldehyde

The compositions of Example 1A were used except that, in the release layer, 0.6 gm of UVA 2-hydroxy-1-naphthaldehyde (10% MEK) (from Aldrich) was used. 2.0 Grams of 2,6-bis(hydroxymethyl)-p-cresol (10% in ethylene glycol dimethyl ether) (Aldrich) was used to replace Durite SD-1708, 0.08 gm of p-toluenesofonic acid was used to replace 0.03 gm of CYCAT 600 and 1.6 gm of CAB 553-04 (10% in MEK) was used to replace 1.4 gm of CAB 553-04.

0.1 Gram of Silwet L7230 was used to replace 0.07 gm of DMS S12. Much higher degree of UV screening (1.6 times of UV screen of the release layer with only SP-12) was observed with less degree of yellowing in the visible region.

Example 14

Pre-Reacted UV Absorber
2,2'-Dihydroxy-4-Methoxybenzophenone

The compositions in example 12 were used except UV absorber, 2,2'-dihydroxy-4-methoxybenzophenone, was pre-reacted with 2,6-bis(hydroxymethyl)-p-cresol before adding into the release layer composition. The synthesis procedure was as follows.

0.5 Grams (2 mmole, Aldrich) of 2,2'-dihydroxy-4-methoxybenzophenone, 0.16 gm of sodium hydroxide (4 mmole) and 40 mL of DI water were placed in a 100 mL round-bottomed flask fitted with a reflux condenser and a calcium guard tube. After the starting materials were dissolved, 0.51 gm (3 mmole, Aldrich) of 2,6-bis(hydroxymethyl)-p-cresol was added and refluxed at 100° C. for 24 hours. The residual dark-colored liquid was cooled and acidified with 10% HCl. The resulting mixture was filtered, washed with water and dried in an oven. The residue was further purified by flash column chromatography (10% ethyl acetate/hexane) to yield 0.3 gm of a pale yellow solid.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An in-mold decoration tape comprising a carrier layer, a release layer, a durable layer, a decorative design layer and an adhesive layer, wherein said carrier layer, said release layer, said durable layer, said decorative design layer and said adhesive layer are sequentially stacked on one another and said release layer comprises a copolymer or interpenetration network formed from a composition comprising:
   (i) an amine-aldehyde condensate; and
   (ii) a radical inhibitor or quencher selected from the group consisting of phenol, methoxyphenol, cresol, phenol formaldehyde resins, novolacs, resoles, resorcinol, salicylates, hydroxyl salicylates, trihydroxybenzene, oximes, hindered amine oxides, nitrosobenzenes and oxidized derivatives or metal complexes of oximes, hindered amine oxides or nitrosobenzenes.

2. The in-mold decoration tape of claim 1, wherein said amine-aldehyde condensate is a formaldehyde condensate of a multifunctional amine.

3. The in-mold decoration tape of claim 2, wherein said multifunctional amine is melamine or urea.

4. The in-mold decoration tape of claim 2, wherein said release layer comprises from about 40% to about 95% by weight of said amine-formaldehyde condensate.

5. The in-mold decoration tape of claim 1, wherein said radical inhibitor or quencher is a polyphenol.

6. The in-mold decoration tape of claim 1, wherein said hindered amine oxide is 2,2,6,6-tetramethyl-1-piperidinyloxy, 4-hydroxy-2,2,6,6-tetramethyl-1-piperidinyloxy or 4-oxo-2,2,6,6-tetramethyl-1-piperidinyloxy.

7. The in-mold decoration tape of claim 1, wherein said release layer comprises about 1% to about 60% by weight of said radical inhibitor or quencher.

8. The in-mold decoration tape of claim 1, wherein said composition further comprises a catalyst.

9. The in-mold decoration tape of claim 8, wherein said catalyst is sulfuric acid, toluene sulfonic acid, dodecylsulfonic acid, dodecylbenzenesulfonic acid, hydrochloric acid, phosphoric acid, HBF$_4$, HPF$_6$, HSbF$_6$, HAsF$_6$ or a salt thereof with a fugitive base.

10. The in-mold decoration tape of claim 1, wherein said composition further comprises a crosslinking agent.

11. The in-mold decoration tape of claim 10, wherein said crosslinking agent is selected from the group consisting of formaldehyde, glyoxal, succinaldehyde, hexamethylene tetramine, phenolics, malonate blocked isocyanates, polyols, carbamate functionalized polymers, amine functionalized polymers and amide functionalized polymers.

12. The in-mold decoration tape of claim 1, wherein said composition further comprises a UV absorbing moiety.

13. The in-mold decoration tape of claim 12, wherein said UV absorbing moiety is o-hydroxy benzophenone, 2,2'-dihydroxy-4-methoxybenzophenone, o-hydroxyphenyl-triazine, salicylates, .alpha.-cyano-.beta.-phenyl-cinnamates, hydroxyphenyl benzotriazole or benzoxazinone.

14. The in-mold decoration tape of claim 1, wherein said composition further comprises a silicone resin.

15. The in-mold decoration tape of claim 14, wherein said silicone resin is a silicone block or graft copolymer or a silicone polymer having at least one reactive functional group.

16. The in-mold decoration tape of claim 1, wherein said composition further comprises an additive.

17. The in-mold decoration tape of claim 1, wherein said composition is dispersed or dissolved in a solvent.

18. The in-mold decoration tape of 17, wherein said solvent is selected from the group consisting of ketones, esters, ethers, glycol ethers, glycolether esters, and pyrrolidones.

19. The in-mold decoration tape of claim 1, wherein said release layer is formed by
dispersing or dissolving said composition and a solvent and
curing said composition.

20. The in-mold decoration tape of claim 19, wherein the radical inhibitor or quencher is oxidized by a thermal or photo-oxidation to improve the UV screening efficiency of the release layer.

* * * * *